(12) United States Patent
Guering (10) Patent No.: US 7,959,453 B2
(45) Date of Patent: Jun. 14, 2011

(54) ELECTRICAL CABINET WITH ELECTRICAL CONNECTION TO ITS DOOR

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 426 days.

(21) Appl. No.: 11/718,899

(22) PCT Filed: Nov. 18, 2005

(86) PCT No.: PCT/FR2005/050964
§ 371 (c)(1),
(2), (4) Date: Jul. 21, 2008

(87) PCT Pub. No.: WO2006/054028
PCT Pub. Date: May 26, 2006

(65) Prior Publication Data
US 2008/0290769 A1 Nov. 27, 2008

(30) Foreign Application Priority Data
Nov. 19, 2004 (FR) .................................. 04 52692

(51) Int. Cl.
*H01R 35/00* (2006.01)
(52) U.S. Cl. ........................ 439/165; 439/31; 361/616
(58) Field of Classification Search ............... 439/165, 439/31; 361/616
See application file for complete search history.

(56) References Cited

U.S. PATENT DOCUMENTS

| 3,355,695 | A | | 11/1967 | Overesch | |
|---|---|---|---|---|---|
| 4,543,800 | A | | 10/1985 | Mawby et al. | |
| 5,681,176 | A | * | 10/1997 | Ibaraki et al. | 439/165 |
| 5,941,619 | A | | 8/1999 | Stiebed et al. | |
| 5,995,373 | A | * | 11/1999 | Nagai | 361/755 |
| 7,097,479 | B2 | * | 8/2006 | Lee | 439/165 |
| 2002/0076960 | A1 | * | 6/2002 | Ibaraki et al. | 439/165 |
| 2004/0266239 | A1 | * | 12/2004 | Kurokawa | 439/165 |

FOREIGN PATENT DOCUMENTS

| CA | 1240847 A1 | 8/1988 |
|---|---|---|
| DE | 19707594 A1 | 10/1997 |
| EP | 1408190 A1 | 4/2004 |

* cited by examiner

Primary Examiner — Hien Vu
(74) Attorney, Agent, or Firm — Perman & Green, LLP (57) ABSTRACT

The invention concerns an electrical cabinet (1) including a housing (2), a door (3) and a hinge (4). The housing and the door support electric wires which are each routed from an electrical component located inside an electrical equipment compartment (11) formed by the housing towards the outside of the compartment to be connected to a corresponding electrical connector (17). Therefor, according to the invention the electric wires are routed through the hinge which is itself connected to the electrical connector. The hinge forms at least one passage orifice (18, 19) guiding, the electric wires from inside the compartment towards the outside of the compartment while directing them towards the electrical connector.

15 Claims, 4 Drawing Sheets

ELECTRICAL CABINET WITH ELECTRICAL CONNECTION TO ITS DOOR

This application is the National Stage of International Application No. PCT/FR2005/050964, International Filing Date, 18 Nov. 2005, which designated the United States of America, and which international application was published under PCT Article 21(2) as WO Publication No. WO 2006/054028 and which claims priority from French Application No. 0452692, filed 19 Nov. 2004.

The invention relates to an electrical cabinet with electrical connection at its door. The invention is aimed at reducing the space requirement created by electrical cables placed within a compartment of electrical equipment formed by the cabinet. The invention can be applied in every technical field using such electrical cabinets equipped with electrical components. In particular, the invention can be applied in aeronautics. In another example, the invention can also be applied to equipment for office buildings.

An electrical cabinet comprises an electrical housing, a closure door and a mechanical hinge. The housing forms a compartment of electrical equipment leading out through an opening. The door co-operates with the electrical housing by means of the hinge, swivelling between at least one closed position and at least one open position. The closed position of the door is a position of the door in which the door covers a surface demarcated by the opening of the compartment of equipment. The open position of the door is a position of the door in which the surface demarcated by the opening of the compartment is not covered by the door. The door swivels relative to the housing by means of the hinge.

The hinge is formed by at least one first linkage means, at least one second linkage means and a means of articulation of the first linkage means with the second linkage means. The first linkage means is fixed to the housing and the second linkage means is fixed to the door. The articulation means may be formed by a holding rod extending along a rotation axis of the hinge. The rotation axis of the hinge is an axis about which the second linkage means is articulated relative to the first linkage means to enable the door to swivel relative to the electrical housing.

In a simple embodiment, these linkage means comprise simple knuckles through which the rod passes. In one embodiment that is a particular object of the invention, the housing comprises electrical components. The electrical components must be connected by electrical cables to other electrical components, for example a large number of them, attached to the door. The fact of attaching components to the door firstly enables the cabinet to be fitted out with many components and secondly makes it possible to preserve a high degree of accessibility to all the components. It is enough to open the door of the cabinet to access the components contained in the compartment and those attached to the door.

The components fixed in the housing or on the door are often presented in banks. In aeronautics, these may be electrical relays or electrical indicator lights assigned to a set of apparatuses of an aircraft. For example, these aircraft apparatuses are control panels positioned at hand near each seat of the aircraft. In building equipment, these components may be electrical relays or circuit-breakers assigned to light bulbs of the building (for example emergency light bulbs).

The components are therefore fixed in the housing and to the door. They are interconnected by electrical wires. Each of these wires is fixed to a component by one end within the compartment and must be connected to another component on the door by its other end. This link may if necessary include a connector at this other end.

These electrical connections are mounted step by step. Normally, an assembler starts by fitting the components out in a bank. For example, he will connect one wire to each of these components. Then he will organize the wires that he has connected into bundles. These bundles are then tied together properly so that the set of wires constituting them does not form an inextricable skein. It thus happens that several bundles are formed, each with about 30 to 60 wires.

These bundles must connect components in the door to components in the housing. Since the door is mobile in opening, these bundles need to have a certain flexibility to enable the opening and closing of the door. In practice, the bundles are made so as to be U-shaped. The two arms of the U are parallel to the axis of the hinge. When the door opens or closes, the two arms of the U undergo a motion of rotation on themselves at the same time as they move away from each other or approach each other. The rotation is permitted because the number of wires in each bundle is not excessive. At the time of closing, the approach is allowed by the dip in the U: the arms of the U get extended and thus recover the available length of play. On the contrary, at the time of opening, the two arms move away from each other and the bottom of the U rises. The U can also be mounted upside down, with its arms pointing downward.

The presence of the U-shaped bundles contributes to encumbering the space contained within the compartment of equipment of an electrical cabinet of this kind. Airing the compartment of the electrical cabinet, which is necessary for the efficient operation of the electrical components contained within it, becomes difficult. Indeed, the resulting density of the cables may have an adverse effect on the thermal discharge normally needed for efficient operation of the electrical components.

To resolve this problem of space requirement, the invention simplifies the routing of the cables from the compartment of the cabinet toward the door of the cabinet. The invention provides for leading the electrical cables through the hinge. The invention thus provides for forming the hinge as an electrical connector, firstly to enable the connection therein of the electrical wires coming from the housing and secondly so as to connect therein the wires coming from the door. Furthermore, the connector-hinge of the invention enables the components situated within the housing or outside the housing to be connected to components situated on the door on the inner side or the outer side of this housing.

Thus, one advantage of an electrical cable of this kind according to the invention lies in an appreciably simplified routing of the electrical cables in the compartment of electrical equipment.

Another advantage of a cabinet of this kind according to the invention is a gain in time for placing the cables in the compartment.

Another advantage is related to a diminishing of the problems related to friction between the cables, between the cables and the housing or between the cables and the door when the door works together with the housing. This diminishing of friction reduces the risks of breakage or premature wearing out of the electrical wires.

Another advantage of the invention is that it optimizes a layout of electrical cables contained in the compartment of the cabinet in order to make the electrical installation of a cabinet of this kind easier and more reliable in terms of safety.

The disclosed embodiments are directed to an electrical cabinet comprising:

an electrical housing internally forming a compartment of electrical equipment, a door for closing this compartment, a hinge formed by a first linkage means and by a second linkage means, the first linkage means being fixed to the housing, the second means being fixed to the door, the first means and the second means being articulated about a rotation axis of the hinge, at least one set of electrical components installed on the door and/or within the compartment, and electrical wires connected to the electrical components, characterized in that:

the linkage means are pierced with a passage hole through which the electrical wires are routed.

Figure 1:
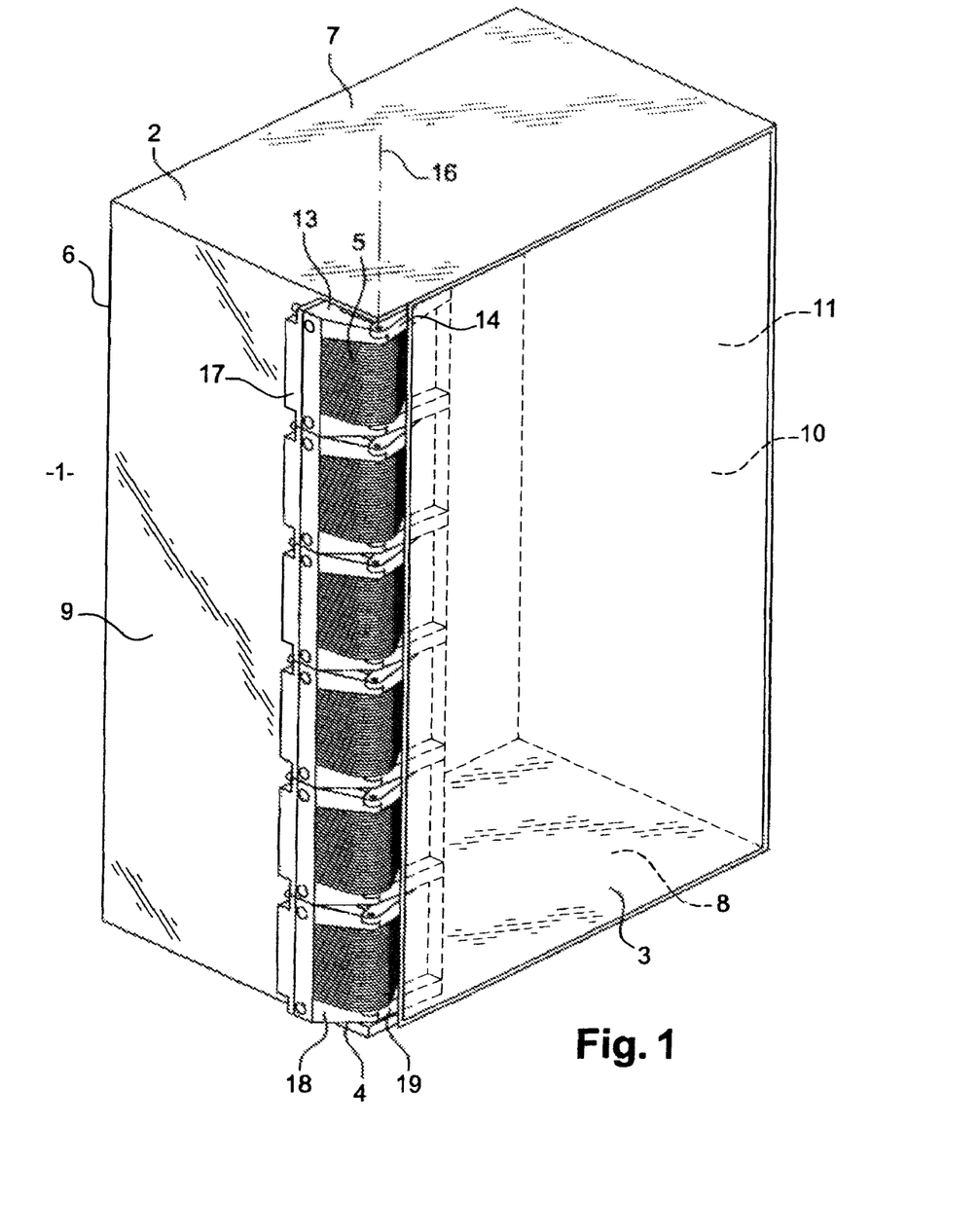
FIG. 1 is a schematic representation of an electrical cabinet according to the invention.

The invention will be understood more clearly from the following description and the accompanying figures. These figures are given purely by way of an indication and in no way restrict the scope of the invention. Of these figures:

FIG. 1 illustrates an electrical cabinet 1 according to the invention. This cabinet 1 may be a relay cabinet or circuit-breaker cabinet of the type found in aeronautics and also in office buildings.

This cabinet 1 is on the whole parallelepiped-shaped. This cabinet 1 has a housing 2, a closure door 3 and a hinge 4.

The housing 2 internally forms an electrical equipment compartment 11. The housing 2 is demarcated by a rear wall 6, an upper wall 7, a lower wall 8 and two side walls 9, 10. The rear wall 6, the upper wall 7, the lower wall 8, and the two side walls 9, 10 demarcate the compartment 11. This compartment encloses electrical components (not shown), electrical wires such as 5, etc. The equipment compartment 11 leads out through an opening 12.

The door 3 is placed parallel to the rear wall 6 and is at the same time fitted to the edges of the inner wall 8, upper wall 7 and side walls 9, 10. The door 3 can be positioned between a closed position and an open position relative to the housing 2. The closed position of the door 3 is a position of the door 3 relative to the housing 2 in which a surface demarcated by the opening 12 of the compartment is covered by the door 3. The open position of the door 3 is a position of the door 3 relative to the housing 2 in which the surface demarcated by the aperture 12 is not covered by the door 3. FIG. 1 illustrates a closed position of the door. The door 3 swivels between the closed position and the open position by means of a hinge 4.

The hinge 4 has at least one first linkage means 13 and at least one second linkage means 14. The first means 13 is fixed to the housing 2 and the second means 14 is fixed to the door 3. The first linkage means and the second linkage means are connected to each other by an articulation means (not shown). This articulation means may be a screw and a nut. Or else, this articulation means may form a holding rod going through the first means 13 and the second means 14 while at the same time holding the first means to the second means relative to an axis 16 of rotation of the hinge 4 and vice versa. This holding rod may extend along an axis that merges with the axis 16 of rotation of the hinge 4. This rotation axis 16 is an axis about which the door 3 swivels relative to the housing 2.

Figure 5:
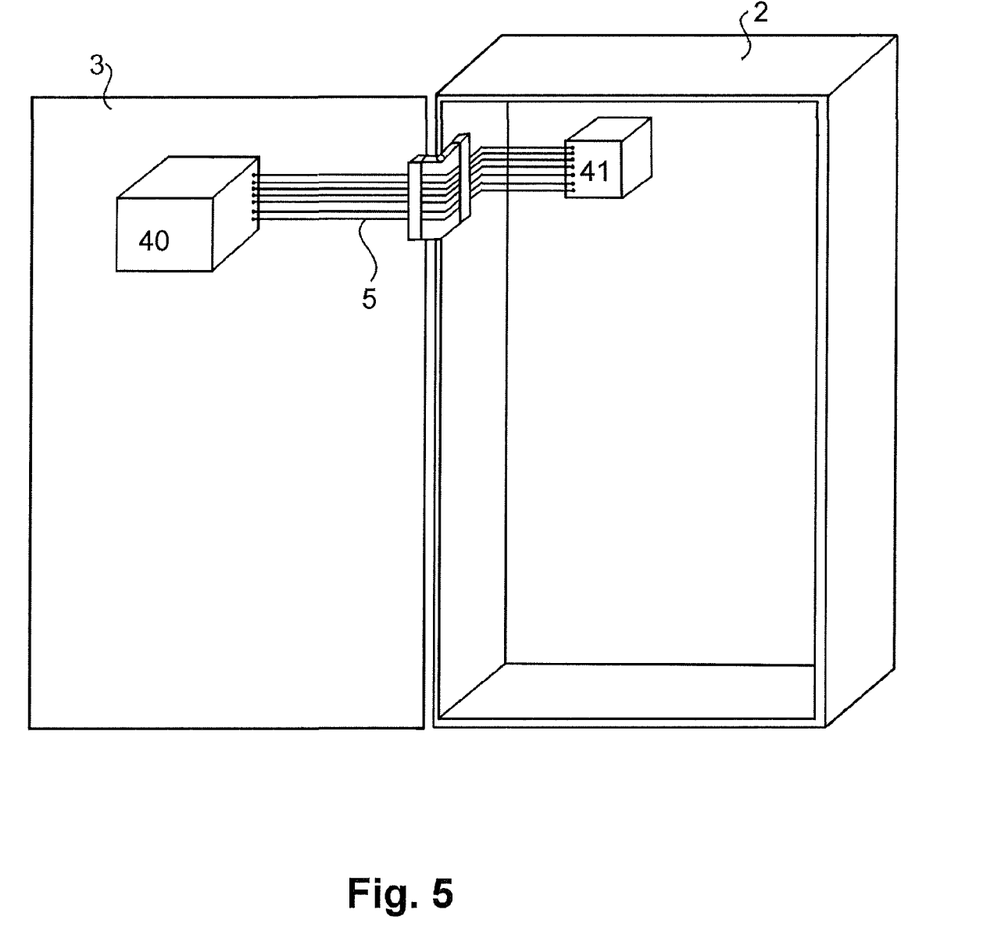
FIG. 5 is another schematic representation of an electrical cabinet according to the disclosed embodiments.

The cabinet 1 also has electrical components 40, 41 (FIG. 5) and electrical wires 5. The electrical components 40, 41 are installed inside the compartment 11 along at least one of the partition walls 6, 7, 8, 9 or 10 of the housing 2 and/or along the door 3 on one side of the door placed so as to be facing the compartment 11. The electrical components 40, 41 may also be installed outside the compartment 11, on the housing and/or on the door. Several electrical wires such as 5 grouped together may form an electrical cable or bundle of electrical fibers. These wires are connected to the electrical components 40, 41.

According to the invention, the linkage means are drilled with a passage hole 18, 19 through which the electrical wires are routed. The first linkage means 13 and the second linkage means 14 each have a passage hole 18 and 19 respectively. Such linkage means prevent the electrical wires 5 from being folded under force against the door 3 and against the housing 2 when the door swivels against the housing to reach the closed position of the door 3.

Figure 2:
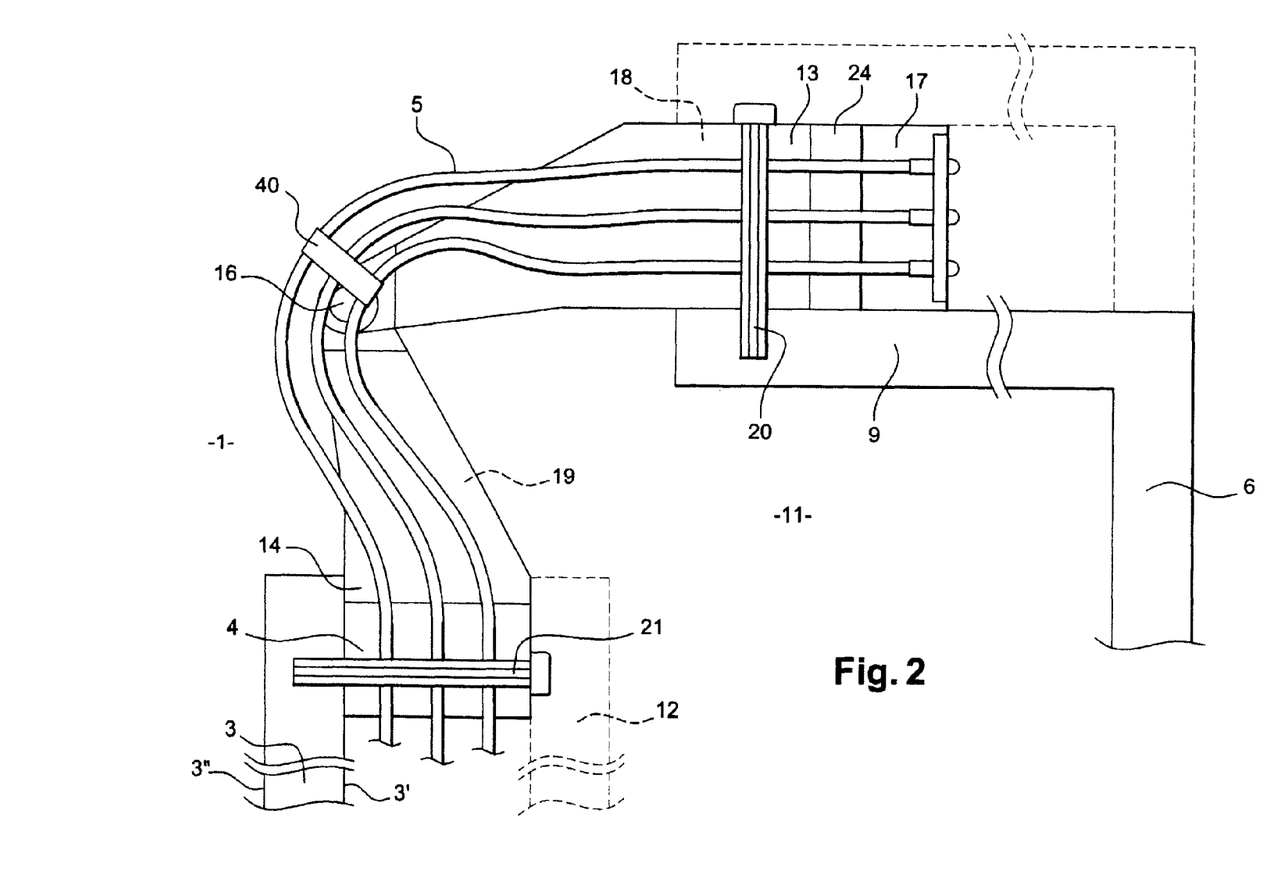
FIG. 2 is a longitudinal section of an electrical cabinet at a place corresponding to a hinge, according to the invention.

FIG. 2 shows a first linkage means or a second linkage means. A linkage means of this kind is formed by a block of parallelepiped-shaped material. In a preferred example of the invention, the first linkage means 13 and the second linkage means 14 each form a part identical to one another. A linkage means of this kind may form a part molded by injection of an insulating material such as plastic. The injection of the plastic material has the advantage of being a relatively low-cost technique. Or else, a linkage means may be formed by the machining of a plastic or metallized material.

The passage hole 18, 19 is formed through the block longitudinally relative to an axis 29 of insertion of the electrical wires through the hinge 4. This insertion axis 29 is an axis perpendicular to the rotation axis 16. The hole 18, 19 therefore demarcates a wall 22 formed by the linkage means. The hole 18, 19 is used to guide the electrical wires by means of the wall 22 parallel to a plane formed by a support to which the linkage means is fixed. A support may be formed by the door 3 or by one of the partition walls 6, 7, 8, 9, 10 forming the housing 2.

A linkage means 13, 14 comprises, longitudinally to the insertion axis 29 and on either side of an axis parallel to the rotation axis 16, a first termination 25 and a second termination 26. The first termination 25 is extended by a first arm 27 and a second arm 28, the first arm and the second arm extending relatively perpendicularly to the rotation axis 16 of the hinge 4 and longitudinally to the axis 29 of insertion of the electrical wires through the linkage means. Each of the arms 27 and 28 extends also in a plane relatively perpendicular to the rotation axis 16. A linkage means of this kind is made in such a way that the passage hole forms a rectilinear conduit along the insertion axis 29 extended by a space demarcated by the first arm and the second arm. The first arm 27 and the second arm 28 have an end 30 and an end 31 respectively. Each end is drilled with a thin channel 32, 33 respectively which is designed to be crossed by the articulation means. Thus, the thin channel of a first arm is superimposed on another thin channel of the second arm longitudinally to the rotation axis 16.

Figure 3:
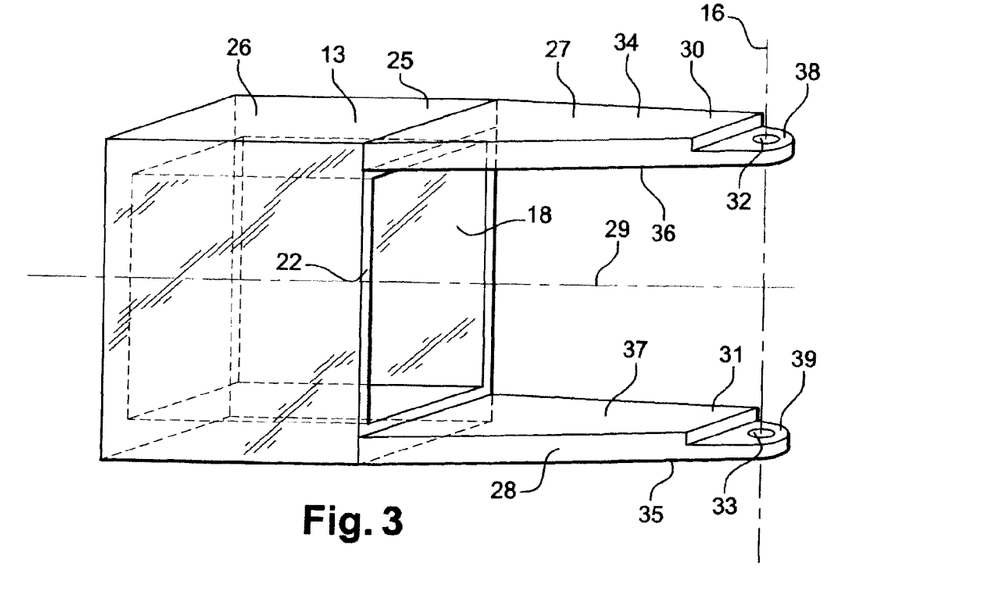
FIG. 3 is a schematic representation of a linkage means according to the invention.

The first arm 27 and the second arm 28 each have an external face 34, 35 and an internal face 36, 37. Each of the internal faces 36 and 37 demarcates a part of the passage hole 18, 19 while each of the external faces is placed opposite corresponding internal faces. In the example of FIG. 3, the internal faces are each placed in a plane parallel to the insertion axis 29 and the external faces are each placed in a plane slightly inclined relative to the insertion axis 29 and are at the same time oriented toward the insertion axis 29. Such shapes of arms reduce the weight and the manufacturing cost of a resulting hinge.

The end 30 of the first arm 27 and the end 31 of the second arm 28 have a first shoulder 38 and a second shoulder 39 respectively, shown in FIG. 3. The first shoulder 38 and the second shoulder 39 are formed on the external face 34 of the first arm 27 and on the internal face 37 of the second arm 28 respectively. The first shoulder 38 and the second shoulder 39 may thus be formed on the internal face 36 of the first arm 27 and on the external face 35 of the second arm 28 respectively. Or else, the first shoulder 38 and the second shoulder 39 may also be formed on the internal face 36 of the first arm 27 and on the internal face 37 of the second arm 28 respectively. Or else, finally, the first shoulder 38 and the second shoulder 39 may also be formed on the external face 34 of the first arm 27 and on the external face 35 of the second arm 28 respectively.

In order to reduce the cost of manufacture of such cabinets, the first shoulder 38 and the second shoulder 39 are preferably formed on the external face 34 of the first arm and on the internal face 37 of the second arm. It is thus possible to make only one mold to manufacture the first linkage means and the second linkage means forming the hinge according to the invention.

A first linkage means of a given pair of linkage means can then co-operate with the second linkage means of this same pair of linkage means through the placing of each of the first shoulders such as 27 in correspondence with one another and each of the second shoulders such as 28 in correspondence with one another too. The second means is placed relative to the first means symmetrically to an axis parallel to the rotation axis 16 and is, at the same time, turned over 180° about the insertion axis 29 of the electrical wires. Thus, the first linkage means of a given pair of linkage means is imbricated, through shape matching, with the second linkage means of the same pair and vice versa by the joining of a first shoulder and the second shoulder of the first means 13 with another first shoulder and another second shoulder of the second linkage means 14.

The joining of the first corresponding shoulders and of the second corresponding shoulders keeps the hinge relatively rigid along the rotation axis of the hinge.

A cabinet 1 may comprise several pairs of linkage means. In one example shown in FIG. 1, the cabinet 1 has six pairs of linkage means. Each given pair of linkage means is capable of receiving a given number of electrical wires. In one example, each pair of linkage means can receive 66 electrical wires.

Each of the electrical wires is takes the shape of a loop whose plane is perpendicular to the axis 16 of the hinge. The electrical wires are presented in sheets of adjacent wires. The plane of these sheets is perpendicular to the axis of the hinge, with wires of these sheets having curvatures in this plane in both directions.

The electrical components may be installed inside the door, facing the compartment 11. Or else, the electrical components may be installed outside the door.

The first means 13 and the second means 14 may be fixed respectively to the housing 2 and to the door 3 by means of screws such as 20 and 21.

In the example shown in FIG. 1, the first means 13 is fixed along the housing 2 outside the compartment 11. The second means 14 is fixed to the door 3 at a position placed so as to be facing the compartment 11 along one side of this same door. More particularly, the door has a first side 3' and a second side 3", the first side 3' being situated so as to be facing the compartment 11 while the second side 3" is situated opposite the compartment. The first side 3' of the door 3 is designed to be placed so as to be facing the compartment 11 when the door 3 is in a closed position relative to the housing. Thus, the second means 14 is more particularly designed to be placed in the first side 3' of the door 3, facing the compartment 11. However, this second means 14 could be placed on the second side 3".

In positioning the first means 13 and the second means 14 according to the example of FIG. 1, the electrical wires can be routed from inside the compartment to the exterior of the compartment and vice versa. The wire is routed from the interior of the compartment 11 to the exterior of the compartment 11 while at the same time being joined along the door 3 to the interior of the compartment 11 on the first side 3' and along the housing 2 to the exterior of the compartment 11 on either side of the axis 16 of rotation of the hinge 4, as shown in FIGS. 1 and 2. Or else, the wire is routed from the interior of the compartment toward the exterior of the compartment 11 and is at the same time joined along the housing 2 to the interior of the compartment 11 and along the door 3 to the exterior of the compartment 11, on the second side 3" on either side of the axis 16 of rotation of the hinge 4.

According to this same example shown in FIG. 1, an electrical connector 17 is connected to at least one of the linkage means. In one example, each of the linkage means 13 and 14 is connected to a connector such as 17. Such a link of the connector 17 to at least one of the linkage means reduces the length of electrical wire 5 necessary for routing from the inside of the compartment 11 toward the exterior of the compartment 11. Furthermore, such a link of the connector 17 to at least one of the linkage means also prevents the electrical wire 5 from being folded by force against the door 3 and against the housing 2 when the door 3 swivels against the housing to reach the closed position of this door 3.

Figure 4:
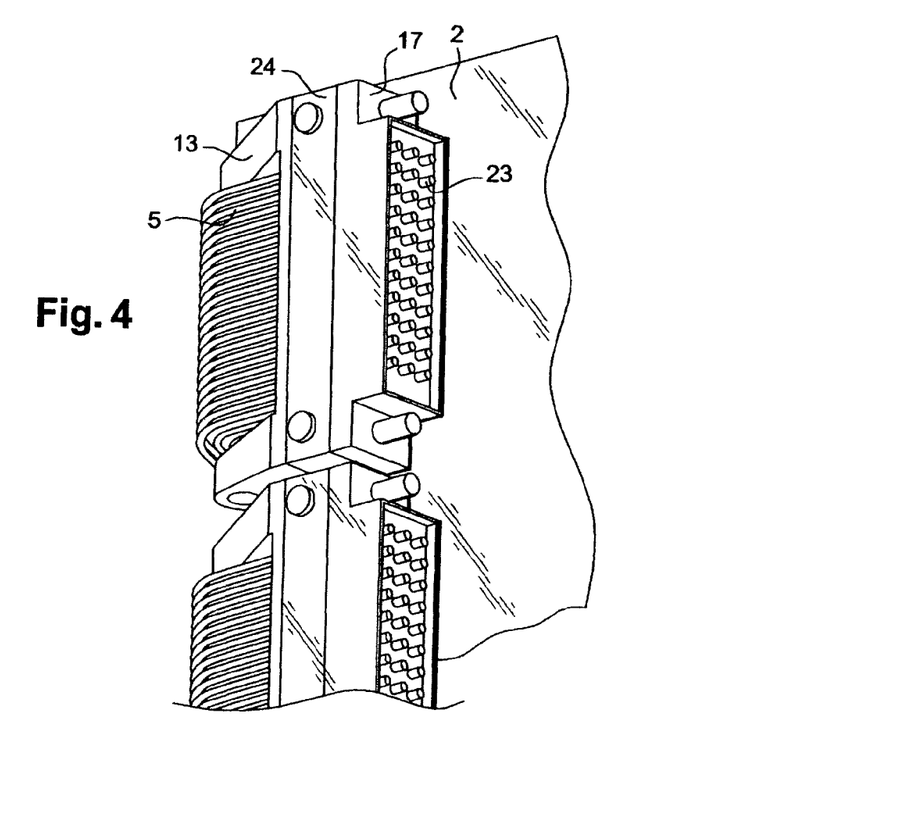
FIG. 4 is a magnified view of a hinge according to the invention.

The connector 17 has at least one metal contact such as 23 designed to be connected to a corresponding electrical wire 5. In one example shown in FIG. 4, the connector 17 has 66 metal contacts such as 23. Each of these contacts may form a male contact or a female contact. Using these same contacts, the connector 17 may get connected to a matching electrical connector (not shown). In one example, the metal contacts of the connector form pin-shaped male terminals. These pins are designed to get inserted through bushings (not shown) of the matching connector, said bushings forming female contacts.

The connector 17 may be fixed to the first linkage means 13 by shape matching. More specifically, the conductor may be connected to the first means 13 by being embedded. The connector 17, the first linkage means 13 and the second linkage means 14 may be fixed to the housing and/or to the door by being screwed in for example.

The electrical wires are grouped together and at the same time go around the rotation axis 16. The wires are kept stretched and grouped together relative to the axis 16 along an axis perpendicular to the axis 16. To do this, the electrical wires of a sheet are held so as to be grouped together relative to the axis 16 through the hinge by means of an elastic holding element 40 which envelops them in packets. This holding element 40 is extended about the packets of wires longitudinally in relation to the rotation axis 16. The holding element 40 not only groups the wires together about the axis 16 but also keeps the wires relatively stretched along a perpendicular axis 23. This holding element 40 may form a flexible and elastic ribbon, made of plastic. In one example, a holding element is position around the packets of wires by pairs of linkage means.

A retaining means 24 for retaining the electrical wires may be interposed between the connector 17 and the first linkage means 13. This retaining means 24 plays a role of retaining the electrical wires each connected to a metal contact 23 of the corresponding connector 17 during an electrical connection and an electrical disconnection of the connector 17, with respect to the matching connector. This retention means 24 also plays an tight-sealing role with respect to the air of the electrical connection between the metal contact 23 of the connector 17 and one end of the electrical wire 5 designed to be connected to the corresponding metal contact 23.

In one example, this retention means 24 may be formed by a block of plastic. This block 24 is pierced with numerous holes (not shown) evenly distributed with respect to one another. Each of these holes is formed along an axis perpendicular to the rotation axis 16 of the hinge 14 and longitudinally to the insertion axis 29. The electrical wires may be inserted through each of the corresponding holes of this block 24 so that these wires are held in place during an electrical connection or disconnection of the electrical connector 17 with respect to the matching electrical connector. The wires are inserted through the block 24 so that, in the corresponding holes, the wires adhere by friction to the material forming the block. Preferably, the block is formed by rubber. The block 24 plays the role of retention of the ends of electrical wires. The wires may then be held by soldering to a corresponding metal contact without risk of being torn off from their corresponding contact, especially during an electrical disconnection of the electrical connector 17 from the matching electrical connector. The block 24 made of plastic may be fixed by screwing or bonding to the housing or the door. The same block may be interposed between the linkage means and the connector 17 while at the same time getting imbricated in the linkage means and in the connector 17.

In one variant of the invention, the retention means may be formed by a cable-clamp device (not shown). This device tends to compress the electrical wires placed at the outlet from the linkage means perpendicularly to the axis 29 of insertion of the wires into the linkage means against the housing or against the door. The device also holds the ends of the electrical wires in position, these wires being intended for connection with the electrical connector. This cable-clamp device may also comprise at least one rigid plate and at least one screw. A first plate and a second plate may be placed on either side of the electrical wires, parallel to a plane formed by the door or by the housing, the second plate being joined to the door or to the housing. This first plate and this second plate are formed out of a material which can be relatively easily deformed by electrical wires so as to favor the retention of the electrical wires between the first plate and the second plate. In one example, this first plate and this second plate may be made of rubber. The first plate is taken toward the door or the housing by being screwed into the door or into the housing through the first plate and the second plate. The screwing of the screw into the door or into the housing causes the first plate to approach the housing or the door, leading to a compression of the wires placed between the first plate and the second plate. Such compression is obtained so as to keep the electrical wires sufficiently in position to prevent these wires from being torn from the metal contacts on which they are fixed when there is an electrical disconnection of the electrical conductor from the matching connector.

The wires are compressed at the same time as they locally deform the first plate and the second plate. Such a change in shape of the first plate and of the second plate makes it possible to hold the wires in position relative to the connector 17.

The method of mounting the electrical cabinet 1 according to the invention is as follows. First of all, the first ends of the electrical wires are each fixed to an electrical component corresponding to first set of components situated in the compartment 11 on the door or on the housing. Then, the wires are inserted through the hinge perpendicularly to the rotation axis. Then, each of the second ends of the wires is fixed to another electrical component corresponding to a second set of components situated on the housing or on the door respectively, outside the compartment 11.

In another variant of the invention, first of all a first end of the electrical wire is fixed to the connector 17 of FIG. 2. Then, the wire is inserted through the hinge perpendicularly to the rotation axis. And then the second end of the wire is fixed to an electrical component situated in the compartment on the door.

The wires may be grouped together by packets through the hinge in enveloping said wires by means of the holding element 40.

Between the connector 17 and the hinge 4, there may be interposed a retention means 24 for holding the electrical wires as described here above, through ends of the electrical wires can be inserted.

For the sake of gains in time and cost, the electrical connector 17 can be supplied in an already prewired state. The wires 5 connected to the lugs of the electrical connector 17 have an extra length. It is then enough, in order to connect them to the door 3, to adjust their length and crimp them to the electrical components after having first made them pass through the holes of the first linkage means (14).

The invention claimed is:

1. An electrical cabinet comprising:
   an electrical housing internally forming a compartment of electrical components, a door for closing the compartment,
   a hinge formed by a first linkage means and by a second linkage means, the first linkage means being fixed to the housing, the second linkage means being fixed to the door, the first and second linkage means being articulated about a rotation axis of the hinge,
   at least one set of electrical components installed on the door and at least one set of the other electrical components installed within the compartment, and
   bundled electrical wires connected to the electrical components, wherein:
   at least one of the first or second linkage means comprises an electrical connector configured to enable a connection of the electrical wires from the housing and configured to connect the electrical wires to the door, and wherein:
   the first and second linkage means are pierced with a passage hole through which the electrical wires are routed, the passage hole being formed longitudinally relative to an axis perpendicular to the rotation axis,
   wherein each of the electrical wire is shaped as a loop whose plane is perpendicular to the axis of the hinge.

2. The cabinet according to claim 1, wherein the bundled electrical wires are presented in sheets of adjacent wires, the sheets defining a plane perpendicular to the axis of the hinge, wherein the electrical wires include curvatures in the plane.

3. The cabinet according to claim 2, wherein the electrical wires of a sheet are held through the hinge by an elastic holding element that envelops the electrical wires of the sheet.

4. The cabinet according to claim 1, wherein the set of components installed on the door is installed on an inside surface of the door, facing the compartment.

5. The cabinet according to claim 1, wherein the connector is fixed to at least one of the first and second linkage means.

6. The cabinet according to claim 5, wherein
   each electrical wire has a first end and a second end, the first end being distant from the connector while the second end is close to the connector, the cabinet further comprising a retention means for the second end of the wire interposed between the connector and the linkage means linked to the connector, the retention means fixedly holding in position the second end of the wire facing the connector during an electrical connection or disconnection of the connector relative to a matching connector.

7. The cabinet according to claim 6, wherein the retention means comprises a block of elastic material pierced with a multitude of holes evenly distributed relative to one another, each of the holes being formed along an axis perpendicular to the axis of rotation of the hinge, and each of the holes configured to receive an electrical wire.

8. The cabinet according to claim 6, wherein the retention means comprises a cable-clamp device compressing the wires perpendicularly to an axis of insertion of the wires in the linkage means against the housing or against the door.

9. The cabinet according to claim 1, wherein the first linkage means and the second linkage means each form a part, one identical to the other.

10. The cabinet according to claim 1, wherein the first means and the second means each form a part coming from a molding of an insulator material.

11. A method for mounting the electrical cabinet according to claim 1, comprising:
inserting the electrical wires through the passage hole of the hinge.

12. The method according to claim 11, comprising:
fixing a first end of the electrical wire to an electrical connector, and,
fixing a second wire end to an electrical component.

13. The method according to claim 11, comprising:
grouping a plurality of the inserted electrical wires together by enveloping them with a holding element configured to hold the plurality of inserted electrical wires taut along an axis perpendicular to the rotation axis of the hinge.

14. The method according to claim 11, comprising:
interposing a retention means between the electrical connector and the hinge, the retention means configured to retain the electrical wires.

15. The method according to claim 14, comprising:
inserting the ends of electrical wires through the retention means.

\* \* \* \* \*

UNITED STATES PATENT AND TRADEMARK OFFICE
CERTIFICATE OF CORRECTION

| | |
|---|---|
| PATENT NO. | : 7,959,453 B2 |
| APPLICATION NO. | : 11/718899 |
| DATED | : June 14, 2011 |
| INVENTOR(S) | : Bernard Guering |

It is certified that error appears in the above-identified patent and that said Letters Patent is hereby corrected as shown below:

Column 8, line 50, Claim 1, delete "wire" and insert -- wires --, therefor.

Signed and Sealed this
Third Day of January, 2012

David J. Kappos
*Director of the United States Patent and Trademark Office*